United States Patent [19]

Gehr et al.

[11] 4,293,955
[45] Oct. 6, 1981

[54] DIVERSITY RECEPTION SYSTEM

[75] Inventors: Marvin M. Gehr; Howell D. Pabian, both of Lincoln, Nebr.

[73] Assignee: Telex Communications, Inc., Minneapolis, Minn.

[21] Appl. No.: 131,029

[22] Filed: Mar. 17, 1980

[51] Int. Cl.³ .......................... H04B 1/16; H04B 7/08
[52] U.S. Cl. ..................... 455/276; 455/278
[58] Field of Search ............... 455/52, 135, 137, 139, 455/140, 272, 273, 276, 304, 278

[56] References Cited

U.S. PATENT DOCUMENTS

| | | | |
|---|---|---|---|
| 2,786,133 | 3/1957 | Dyke | 455/272 |
| 2,854,568 | 9/1958 | Lewin et al. | 455/273 |
| 4,160,952 | 7/1979 | Seastrand, Jr. | 455/276 |

Primary Examiner—Jin F. Ng
Attorney, Agent, or Firm—Vincent L. Carney

[57] ABSTRACT

To reduce fading in a diversity receiver, the signals received on two spaced-apart antennas are added together without phase shift while amplitude of the sum is above a certain threshold. When the signal falls below the threshold, the signal from a squelch detector causes the sum amplitude to be stored and then a 180° time delay to be inserted between one of the antennas and the adding circuit, after which time, the new sum amplitude is compared with the stored signal amplitude. If the new signal has increased or remained the same, the 180° phase shift remains in place but, if it has deteriorated, it is removed and the circuit reset.

25 Claims, 3 Drawing Figures

DIVERSITY RECEPTION SYSTEM

This invention relates to diversity radio receivers.

In one class of diversity radio receiver, a plurality of antennas are used to receive signals transmitted from a single source to reduce fading caused by multipath cancellation of the signals from the single source. The strength of the received signal is indicated by the squelch and this indication controls the antennas in such a manner as to minimize fading.

In one prior art type of diversity receiver of this class, the indication from the squelch circuit switches the receiver from antenna to antenna to obtain the best signal.

In another type of diversity receiver of this class, a phase shift is imposed between the signal received from one antenna and the signal from the other antenna. The signals from both antennas are added together and the phase is continually changed in accordance with changes in the sum of the signals In still another prior art type of diversity receiver of this class, the signals from the antennas are modulated with an average frequency carrier to remove phase shift components and the signals are added together to provide a total signal stronger than the individual signals received by each antenna.

The prior art space diversity receivers have the disadvantages of being relatively complex and thus expensive. Some are complex because the signals are applied from each antenna to a corresponding one of several portions of receivers before being added for final processing. Moreover, some of the circuits for correcting for phase shift, switching from antenna to antenna or receiver to receiver or for modulation are complicated and expensive.

Accordingly, it is an object of this invention to provide a novel method for reducing fading from radio systems.

It is a further object of this invention to provide a novel diversity radio receiving system.

It is a still further object of the invention to provide a simple and inexpensive space diversity receiving system.

It is a still further object of the invention to provide a space diversity receiver in which the signals from antennas are normally added in phase but when the sum of the signals falls below a predetermined amplitude a phase shift is introduced in circuit with one of the antennas to delay one signal.

In accordance with the above and further objects of the invention, a space diversity radio system includes at least first and second antennas and a means for adding the signals from the two antennas and applying them to a receiver for processing. The receiver has means which indicates when the sum of the signals falls below a certain threshold. When this indication occurs, the signal is stored and a delay of more than 90° is connected in circuit with one of the antennas so that a new sum signal is formed. The new sum signal is compared with the stored signal and the delay is disconnected when the new sum signal is of a lower amplitude than the stored signal.

In operation, a transmitted signal is received by each of the two antennas along a multipath transmission path which may in some instances cause fading. The two received signals are transmitted to a point in the circuit where they are added together, with the signal from one antenna being applied to that point through a circuit which may selectively cause a delay of more than 90° and preferably a 180° of the carrier waveform before it is applied to the point for addition. The switching between the two paths is accomplished by biasing diodes which block one of two paths, the blocking signal coming from a squelch detector of the radio receiver.

From the above description, it can be understood that the space diversity radio system of this invention has the advantages of being relatively inexpensive and simple in construction.

The above noted and other features of the invention will be better understood from the following detailed description when considered with reference to the accompanying drawings in which.

Figure 1:
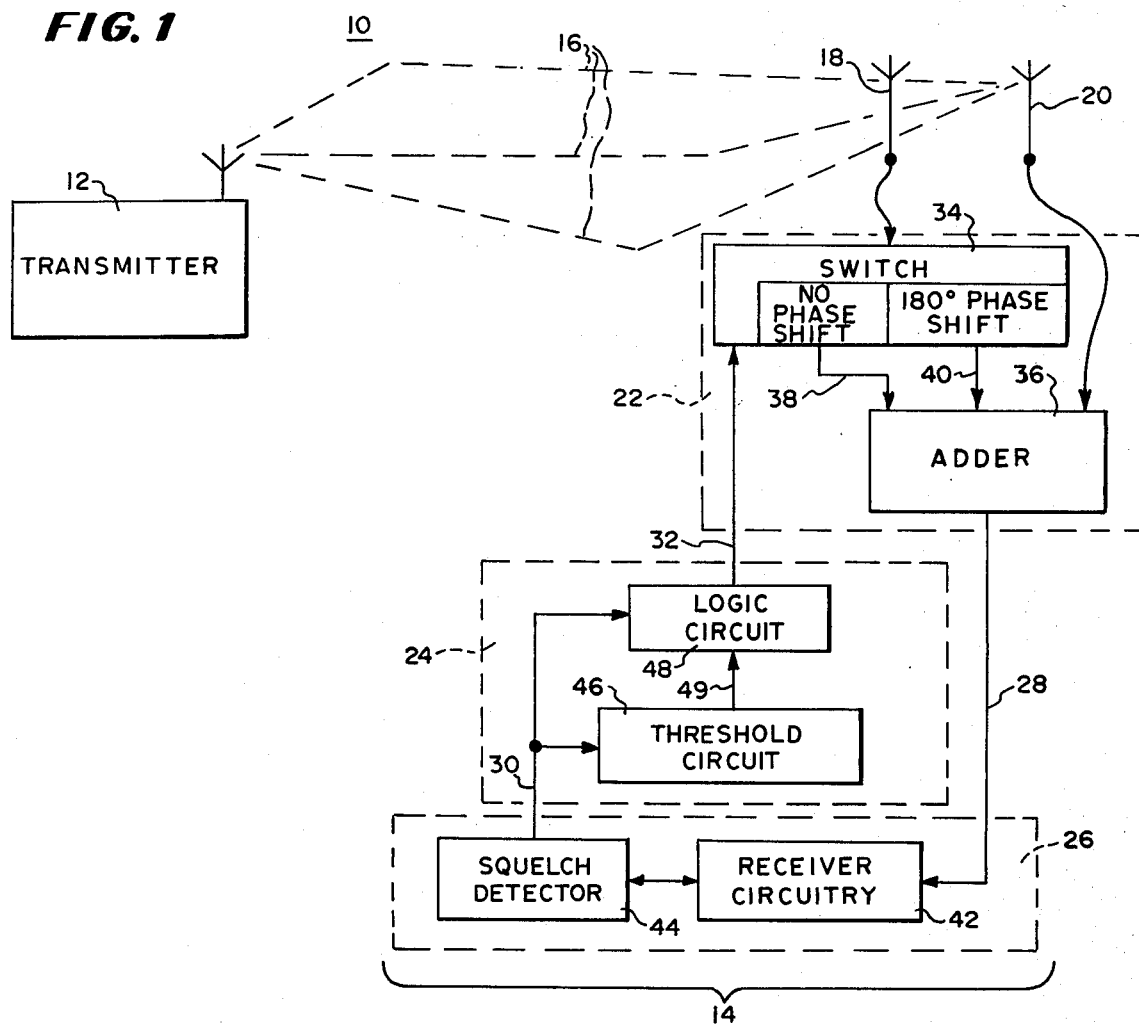
FIG. 1 is a block diagram showing an embodiment of the invention.

In FIG. 1, there is shown a diversity radio system 10 having as its principal parts a transmitter and a receiver. In the preferred embodiment illustrated by FIG. 1, the transmitter is part of a hand-held transmitter 12 and the receiver is part of a central station 14 which communicates with the hand-held portable transceiver to serve as a central communication link. As shown in FIG. 1, the hand-held transmitter 12 transmits a signal through a plurality of paths 16 to the central station 14. One reason the signal may follow different paths is because of reflections from objects.

The central station 14 includes first and second antennas 18 and 20, an antenna-signal combining circuit 22, a phase selecting circuit 24, and a receiver 26.

The antenna-signal combining circuit 22 is electrically connected to the first and second antennas 18 and 20 to combine the signals received from these antennas either with no phase shift or 180° phase shift. It is electrically connected to the transceiver 26 through a conductor 28 to apply the resulting summation of the signals from the first and second antennas 18 and 20 to the receiver 26.

The phase selecting circuit 24 is electrically connected to the receiver 26 through a conductor 30 to determine when the signal is fading because of cancellation of the radio waves transmitted along a plurality of paths 16 between the hand-held transmitter 12 and the first and second antennas 18 and 20. It is also electrically connected to the antenna-signal combining circuit 22 through a conductor 32 to select a first mode of addition with no phase shift or a second mode in which there is addition by 180° phase shift before addition of signals from the antennas in accordance with whether or not the signal at the receiver 26 is fading.

The antenna-signal combining circuit 22 includes a phase shift switch 34 and an adder 36. The phase shift switch 34 is electrically connected to the first antenna 18, to the adder 36 through conductors 38 and 40 and to the phase selecting circuit 24 through conductor 32.

The signal received from the first antenna 18 is connected to conductor 38 directly in one mode of operation of the phase shift switch 34 and to conductor 40 after being shifted 180° in a second mode of the phase shift switch 34. The modes are selected by a signal on conductor 32, which in the preferred embodiment applies a positive potential to cause the phase shift switch 34 to impart a 180° phase delay to the signal from the first antenna 18 before applying it through conductor 40 to the adder 36.

The adder 36 is electrically connected to the second antenna 20 and to conductors 38 and 40. It combines the signal received from the second antenna 20 with the signal received on conductor 38 or 40 depending on the mode of operation of the phase shift switch 34 and applies the combined signals to the receiver 26 through the conductor 28.

The receiver 26 includes the usual circuitry of a transceiver as indicated at 42 with a conventional squelch detector 44 being indicated separately. The squelch detector 44 indicates when the signal is below a threshold value in the transceiver in a manner known in the art. The conductor 30 thus receives the indication when the receiver 26 is receiving no signal or a weak signal and transmits it to the phase selecting circuit 24.

Although the indicating potential applied to conductor 30 in the preferred embodiment is derived from the squelch detector 44, it may be derived from other locations in the receiver or indeed by a separate receiver which detects the presence or absence of a signal. Moreover, while in the preferred embodiment, the central station 14 includes a receiver, the invention may be used with a central station that includes only a transceiver.

The phase selecting circuit 24 includes a threshold circuit 46 and a logic circuit 48. The conductor 30 electrically connects the squelch detector 44 to both the threshold circuit 46 and to the logic circuit 48, with the threshold circuit 46 detecting when the signal on conductor 30 is above a fixed threshold and applying a signal to the logic circuit 48 at that time through conductor 49.

When the logic circuit 48 receives a signal on conductor 49 indicating a weak signal, it stores the signal it is receiving on conductor 30 indicating a fading of the received signal and in a timed sequence: (1) causes the antenna-signal combining circuit 22 to apply a 180° phase shift to the signal on the first antenna 18; (2) compares the amplitude on conductor 30 with the stored signal and, if it is lower at a fixed time later; and (3) removes the time delay.

In operation, the operator of the hand-held transmitter 12 may use it when walking from place to place to transmit information to the central station 14. When used, the radio waves transmitted from the hand-held transmitter 12 will follow different paths to the antennas of the central station 14. In some locations, such as in a factory building or the like, the reflections change from time to time and cause cancellation and fading at certain locations.

Some cancellation from the multipath signal can be tolerated and compensated for by the automatic gain control of the receiver. However, when the signal at first antenna 18 is nearly equal to the signal at second antenna 20 and the phase difference is nearly 180°, the signal fades entirely and will not be received above the noise.

While the signal received by the receiver 26 is within an acceptable range, the phase shift switch 34 applies the signal received on the first antenna 18 directly to the conductor 38 so that the adder 36 combines the signals from the first and second antennas 18 and 20 additively.

This combined signal is applied to the receiver 26 after being added through conductor 28 where it is converted to audio and then to sound at the central station 14.

When the signal fades, an indication is applied by the squelch detector 44 through conductor 30 to the threshold circuit 46, and if it is above a certain threshold, the logic circuit 48 samples the signal and stores it for later comparison to determine if the signal improved when the 180° phase shift switch 34 is operated.

After a short period of time, a 180° phase shift is introduced between the signal received on first antenna 18 and the conductor 38 by the phase shift switch 34 and maintained while comparison continues within the logic circuit 48. If the signal is improved, the switch remains and the circuit is reset but if it does not improve, the 180° phase shift is removed and addition continues as before.

Figure 2:
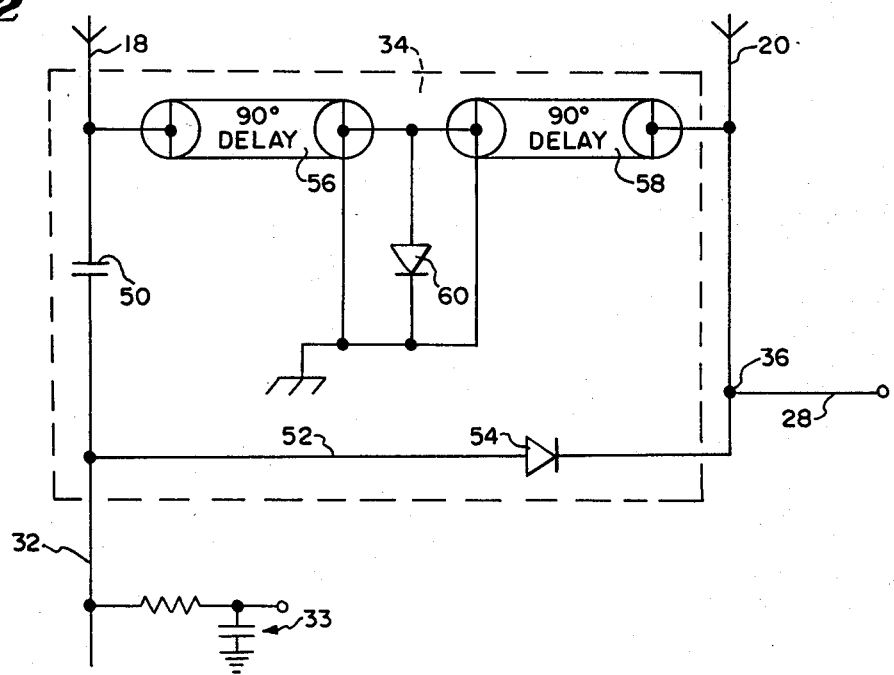
FIG. 2 is a schematic circuit diagram of a portion of the embodiment of FIG. 1.

In FIG. 2, there is shown a schematic circuit diagram of the phase shift switch 34, the first and second antennas 18 and 20, and the adder 36. As shown in this figure, conductor 32 from an RC output circuit 33 of the logic circuit 48 (FIG. 1) applies signals to the phase shift switch 34 to control the phase relationship of the signals when they are added at 36. The conductor 28 is connected to the adder 36 to transmit signals from the adder to the transceiver circuitry 42 (FIG. 1).

To apply signals directly from the first antenna 18 without a phase shift to the adder 36 in a first mode, the first antenna 18 is electrically connected to the adder 36 through a capacitor 50, a conductor 52, and the forward resistance of a diode 54. Conductor 32 is connected to the junction of conductors 50 and 52 so that when it is positive, the diode 54 is conductive and signals from the first antenna 18 are applied directly to the adder 36.

To apply signals from the first antenna 18 to the adder 36 through a 180° phase shift in a second mode, the phase shift switch 34 includes first and second 90° phase delay lines 56 and 58 and a diode 60. A first end of the 90° delay 56 is electrically connected to the first antenna 18 and the second end is electrically connected to a first end of the 90° delay line 58 and to ground through the forward resistance of the diode 60, the second end of the 90° delay line 58 being electrically connected to the adder 36.

With this relationship, when the signal on conductor 32 is low, the diodes 54 and 60 are blocked and the signal passes through the delay lines 56 and 58 to the adder 36. When the signal on conductor 32 is high, diode 60 is conductive thus shorting signals and preventing them from reaching the adder 36 through delay lines 56 and 58.

Generally, the phase shift switch 34 operates in either a first mode in which there is no phase shift between the signals on first and second antennas 18 and 20 before they are added and a second mode in which there is 180° phase delay of the signal on first antenna 18 before it is added to the signal received on second antenna 20. This is controlled by the signal on conductor 32 which operates to open and close the diode switches 60 and 54 to either insert the 90° delay lines 56 and 58 or bypass them in paths between the first antenna 18 and the adder 36.

In the first mode of operation, a positive signal is applied to conductor 32 from the logic circuit 48 (FIG. 1) which forward biases the diodes 54 and 60. With this arrangement, there is no path through the two 90° delay lines 56 and 58 to the adder 36 because diode 60 is forward biased which stops any signals from flowing delay line 56 to delay line 58. On the other hand, signals may pass from the first antenna 18 through the conductor 52 and the forward biased diode 54 to the adder 36.

The adder 36 is a junction at which the signals from the first antenna 18 are added to the signals from the second antenna 20 for application to conductor 28.

In the second mode, the signal on conductor 32 is low, which reverse biases diodes 60 and 54 to block signals from the first antenna 18 through conductor 52. Signals from the first antenna 18 pass through the delay lines 56 and 58 to the adder 36 where they are added with signals from the second antenna 20, but 180° out of phase with it.

Figure 3:
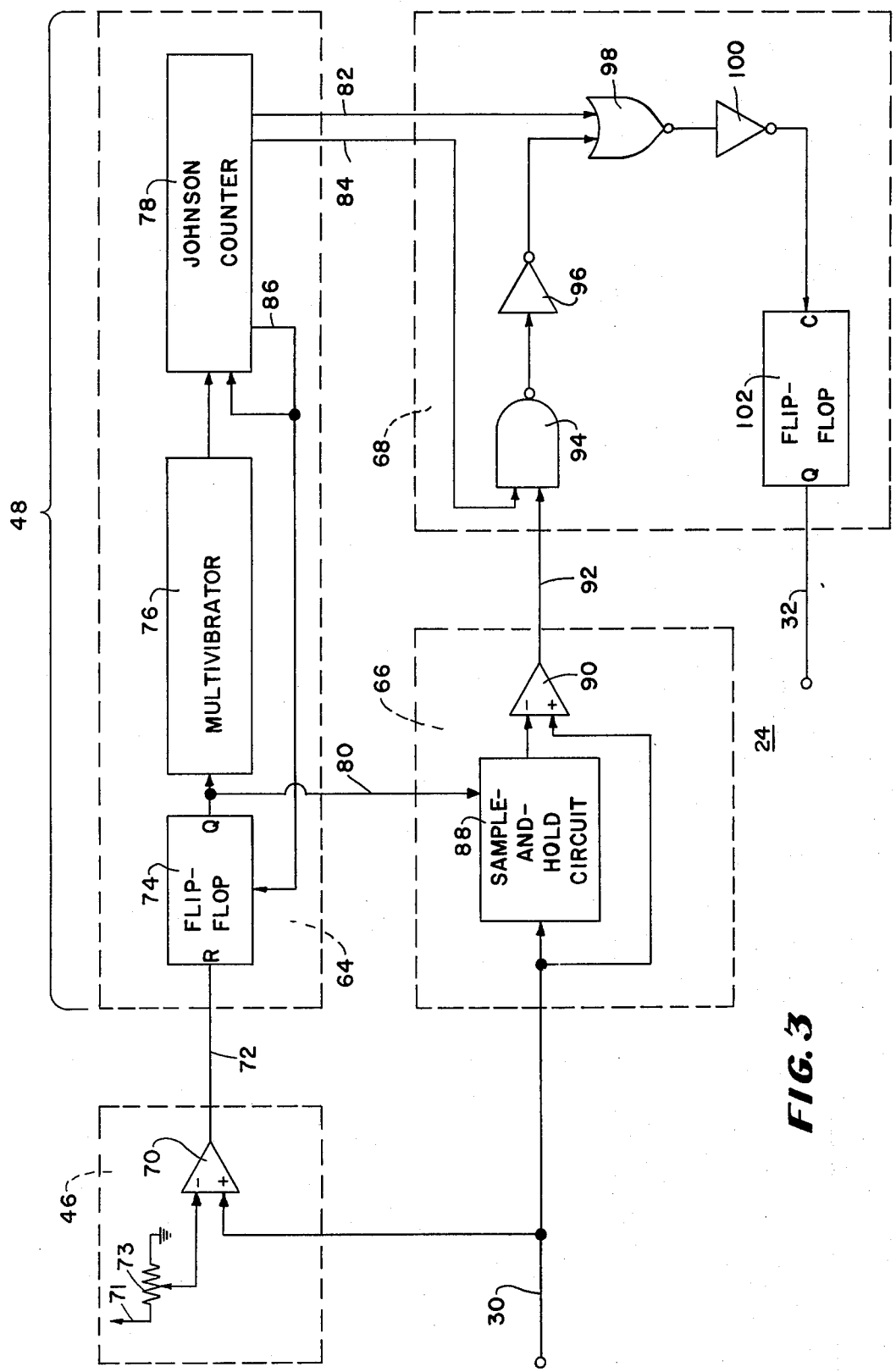
FIG. 3 is a schematic circuit diagram of another portion of the embodiment of FIG. 1.

In FIG. 3, there is shown a schematic circuit diagram, partly in block diagram form, of the phase selecting circuit 24 having a threshold circuit 46 and the logic circuit 48 electrically connected to receive signals from the squelch detector 44 (FIG. 1) through conductor 30 and to provide signals through conductor 32 to the antenna-signal combining circuit 22 (FIG. 1).

The logic circuit 48 includes a timer circuit 64, a comparator circuit 66 and an output circuit 68. The comparator circuit 66 is connected to the conductor 30 to receive signals from the squelch detector 44. The timer circuit 64 is connected to the output of the threshold circuit 46 and provides timing signals to the output circuit 68 and to the comparator circuit 66. The output circuit 68 receives signals from the comparator circuit 66 and transmits switching signals on conductor 32 to the antenna-signal combining circuit 22 (FIG. 1) under the control of timing signals and the comparator circuit 66.

To determine when the signal received by the receiver in the central station 14 has fallen below a predetermined minimum, the threshold circuit 46 includes a comparator 70 having its output electrically connected to the timing circuit 64 through a conductor 72. One of the inputs of the comparator 70 is electrically connected to conductor 30 and the other is electrically connected to a positive source of potential 71 through a potentiometer 73 to set the threshold level.

With this arrangement, the signal from the squelch detector 44 (FIG. 1) is received on the positive or non-inverting input of the comparator 70 and a positive signal set by the potentiometer 73 is applied continuously to its negative or inverting terminal. As the signal from the squelch detector 44 increases in amplitude indicating the fading of the signal, it crosses the threshold set by the potentiometer 73 and causes an output to be applied through conductor 72 to the timing circuit 64.

The timing circuit 64 includes a flip-flop 74, a multivibrator 76, and a counter 78. The flip-flop 74 is reset by a high potential on conductor 72 from the threshold circuit 46 indicating that the received signal in central station 14 has faded. When reset, it: (1) grounds a terminal of multivibrator 76 causing it to generate oscillations and apply them to the counter 78; and (2) applies a potential through conductor 80 to the sample-and-hold circuit 88, causing it to hold the signal on conductor 30 from the squelch detector 44 (FIG. 1) and hold it so as to have a representative signal of the threshold at that time.

The counter 78 counts quickly to conductor 82, then to conductor 84 and finally to conductor 86. Conductors 82 and 84 are electrically connected to the output circuit 68 and conductor 86 is connected to the reset terminal of the counter 78 to reset it and to the set input terminal of the flip-flop 74 to return it to its initial condition. Thus, the timing circuit 64 provides output timing signals which sequence the output circuit 68 and the comparator circuit 66 to ultimately control the time delay inserted between the signal received on the first antenna 18 and the adder 36 (FIGS. 1 and 2).

The comparator circuit 66 includes a sample-and-hold circuit 88 and a comparator 90. The sample-and-hold circuit 88 is electrically connected to the conductors 30 and 80 to receive signals from the squelch detector 44 (FIG. 1) indicating the strength of the signal received and to hold that signal in response to a signal on conductor 80 when the threshold of the threshold detector 46 is exceeded, indicating fading of the signal.

The comparator 90 has one input electrically connected to the sample-and-hold circuit 88 and one input electrically connected to the conductor 30 to compare the signal at the time the threshold of the threshold circuit 46 is exceeded with signals later from the squelch detector 44. The output of the comparator 90 is electrically connected through a conductor 92 to an input of the output circuit 68.

To apply signals to conductor 32 so as to introduce a 180° time delay between the first antenna 18 and the adder 36 (FIGS. 1 and 2), the output circuit 68 includes a NAND gate 94, an inverter 96, a NOR gate 98, an inverter 100, and a flip-flop 102.

Conductor 82 which is the first conductor counted by the counter 78 during a cycle is electrically connected to one input of the NOR gate 98, the output of which is electrically connected through the inverter 100 to the input of the flip-flop 102 so that, when conductor 82 is energized by the counter 78, the flip-flop 102 is reset and applies a low potential to conductor 32, thus introducing a 180° delay between the conductor 28 and the adder 36 (FIGS. 1 and 2). Otherwise, the flip-flop 102 is in its set state and applies a positive potential to conductor 32, causing the signals on first and second antennas 18 and 20 to be added together without a phase shift by the adder 36.

One input of the NAND gate 94 is electrically connected to the second conductor 84 from the counter 78 and its other input is electrically connected to conductor 92, its output being electrically connected through the inverter 96 to the other input of the NOR gate 98 so that a positive pulse is applied to the NOR gate 98 when the counter 78 counts to the second conductor 84 during a cycle if the signal on conductor 30 has increased above the signal stored in the sample-and-hold circuit 88.

Thus, if the signal from the squelch detector 44, which is applied to the inverting terminal of comparator 90, has increased indicating that the fading has increased when the counter counts to the second conductor 84, another pulse is applied through the NAND gate 94 to again switch the flip-flop 102 so that it returns to its original antenna arrangement in which the 180° phase delay is removed and the signals from first and second antennas 18 and 20 are connected directly together. With this arrangement, it can be seen that only if the signal being received by the central station 14 (FIG. 1) improves or remains the same will the 180° phase delay be introduced between first antenna 18 and the adder 36 (FIGS. 1 and 2).

With the circuit shown in FIG. 3, a threshold value is set which corresponds to a level of signal received by the central station 14. When the signal fades below this level set by the potentiometer 73 in the threshold circuit 46, the sample-and-hold circuit 88 stores the value and begins comparing it with changes in the output from the squelch detector 44 (FIG. 1).

Under these circumstances, the counter 78 within the timing circuit 64 generates timing signals that sequentially: (1) insert a 180° time delay between the first antenna 18 and the adder 36 (FIGS. 1 and 2) by applying a negative potential to conductor 32; (2) counts to a position at which time the input signal on conductor 30 is compared to the stored signal to determine if the fading of the signal in the central station 14 has become worse; and (3) if it has become worse, the flip-flop 102 is switched so that the 180° time delay is removed, thus returning the circuit to a condition in which the signals received on first and second antennas 18 and 20 are directly added.

From the above description, it can be understood that the diversity system of this invention has several advantages such as: (1) it is relatively simple; (2) it is reliable; and (3) it is inexpensive because of its simplicity.

Although a preferred embodiment has been described with some particularity, many modifications and variations are possible in the preferred embodiment without deviating from the invention. Therefore, it is to be understood that, within the scope of the appended claims, the invention may be practiced other than as specifically described.

What is claimed is:

1. A method of processing signals transmitted over multipath routes on a carrier frequency comprising the steps of:
    receiving said signals through at least two antennas;
    adding the signals received on said antennas;
    selecting one of a first mode for adding the signals received on said antennas in which there is a first phase shift in the signals from a first of said antennas and a second mode in which there is a second phase shift more than 90° of the carrier frequency difference from said first phase shift of said signal received from said one of said antennas before said signals are added;
    the step of selecting further including the steps of comparing the amplitude of the sum of the added signals to a predetermined threshold value; determining which of said first and second modes provides the highest amplitude signal and switching to the mode which provides the highest amplitude signal;
    said step of determining comprising the steps of switching from one of said modes to the other mode when said amplitude is lower than said predetermined threshold value; and comparing the amplitude of the sum of the added signals after switching to said other mode with the sum before switching; and
    the step of switching to the mode that provides the highest amplitude signal including the step of returning to the one of said first and second modes if the strength of said sum of the signals is below that amplitude at the time of switching between one and other of said first and second modes.

2. A method according to claim 1 in which:
    the step of selecting one of the first and second modes includes the step of selecting one of a first and second path;
    said step of selecting said second path includes the step of selecting a path having a time delay;
    said method further including the step of applying said signals to radio receiver circuitry after they are added;
    deriving a signal from a squelch circuit in the radio receiver circuitry;
    the step of selecting said first path includes the step of biasing a diode in one direction in one of said first and second paths with a signal derived from the squelch circuit; and
    the step of selecting the second path including the step of biasing said diode in the opposite direction from said first direction with the signal derived from the squelch circuit.

3. A method according to claim 1 in which the step of selecting one of the first and second mode includes the step of selecting a first mode in which there is no phase shift and a second mode in which the phase shift is 180°.

4. A method according to claim 3 in which the step of selecting said second mode includes the step of transmitting the signal from said one antenna through time delay circuits.

5. A method according to claim 4 in which the step of comparing the amplitude of the sum of said signals includes the step of comparing the amplitude of a squelch signal in a radio receiver to said predetermined threshold value.

6. A method according to claim 5 in which:
    the step of selecting one of the first and second modes includes the step of selecting one of a first and second path;
    said step of selecting said second path includes the step of selecting a path having a time delay;
    said method further including the step of applying said signals to radio receiver circuitry after they are added;
    deriving a signal from a squelch circuit in the radio receiver circuitry;
    the step of selecting said first path includes the step of biasing a diode in one direction in one of said first and second paths with a signal derived from the squelch circuit; and
    the step of selecting the second path including the step of biasing said diode in the opposite direction from said first direction with the signal derived from the squelch circuit.

7. A method according to claim 3 in which:
    the step of selecting one of the first and second modes includes the step of selecting one of a first and second path;
    said step of selecting said second path includes the step of selecting a path having a time delay;
    said method further including the step of applying said signals to radio receiver circuitry after they are added;
    deriving a signal from a squelch circuit in the radio receiver circuitry;
    the step of selecting said first path includes the step of biasing a diode in one direction in one of said first and second paths with a signal derived from the squelch circuit; and
    the step of selecting the second path including the step of biasing said diode in the opposite direction from said first direction with the signal derived from the squelch circuit.

8. A method according to claim 4 in which:
    the step of selecting one of the first and second modes includes the step of selecting one of a first and second path;
    said step of selecting said second path includes the step of selecting a path having a time delay;

said method further including the step of applying said signals to radio receiver circuitry after they are added;

deriving a signal from a squelch circuit in the radio receiver circuitry;

the step of selecting said first path includes the step of biasing a diode in one direction in one of said first and second paths with a signal derived from the squelch circuit; and the step of selecting the second path including the step of biasing said diode in the opposite direction from said first direction with the signal derived from the squelch circuit.

9. A method according to claim 1 in which the step of selecting said second mode includes the step of transmitting the signal from said one antenna through time delay circuits.

10. A method according to claim 9 in which the step of comparing the amplitude of the sum of said signals includes the step of comparing the amplitude of a squelch signal in a radio receiver to said predetermined value.

11. A method according to claim 1 in which the step of comparing the amplitude of the sum of said signals includes the step of comparing the amplitude of a squelch signal in a radio receiver to said predetermined threshold value.

12. A method of processing signals transmitted over multipath routes on a carrier frequency comprising the steps of:

receiving said signals through at least two antennas;

adding the signals received on said antennas;

selecting one of a first mode in which there is no phase shift in the signals from a first of said antennas and a second mode in which there is a phase shift of 180° of the carrier frequency of said signals received from the one of said antennas before said signals are added;

comparing the amplitude of the sum of the added signals to a predetermined threshold value;

selecting said second mode when said amplitude is lower than a said predetermined threshold value;

the step of comparing the amplitude of the sum of said signals including the step of comparing the amplitude of a squelch signal from a squelch circuit in a radio receiver to said predetermined threshold value;

the step of selecting one of the first and second mode including the step of selecting one of a first and second paths;

said step of selecting said second path including the step of selecting a path having a time delay;

the step of selecting said first path including the step of biasing a diode in one direction in one of said first and second paths with a signal derived from the squelch circuit; and the step of selecting the second path including the step of biasing said diode the opposite direction from said first direction with the signal derived from the squelch circuit.

13. A method of processing signals transmitted over multipath routes on a carrier frequency comprising the steps of:

receiving said signals through at least two antennas;

adding the signals received on said antennas;

selecting one of a first mode in which there is no phase shift in the signals from a first of said antennas and a second mode in which there is a phase shift of 180° of the carrier frequency of said signals received from the one of said antennas before said signals are added;

comparing the amplitude of the sum of the added signals to a predetermined threshold value;

selecting said second mode when said amplitude is lower than a said predetermined threshold value;

returning to the other of said first and second modes if the strength of said signal falls below that amplitude at the time of switching between said first and second modes;

the step of selecting said second mode including the step of transmitting the signal from said one antenna through time delay circuits;

the step of comparing the amplitude of the sum of said signals including the step of comparing the amplitude of a squelch signal from a squelch circuit in a radio receiver to said predetermined threshold value;

the step of selecting one of the first and second modes including the step of selecting one of a first and second path;

said step of selecting said second path including the step of selecting a path having a time delay;

the step of selecting said first path including the step of biasing a diode in one direction in one of said first and second paths with a signal derived from the squelch circuit; and the step of selecting the second path including the step of biasing said diode in the opposite direction from said first direction with the signal derived from the squelch circuit.

14. Apparatus for processing electromagnetic signals transmitted at a carrier frequency over a multipath route, comprising:

at least first and second antennas;

means for adding the signals received by said first and second antennas together to provide a sum signal;

first time delay means;

second time delay means for delaying said signals for at least 90° of a cycle of the carrier wave of said signals more than said first time delay means;

receiver means for processing said sum signal;

indicating means for providing an indicating signal related to the amplitude of said sum signal;

switch means responsible to said indicating means for selectively connecting said first and second time delay means into respective first and second paths between said first antenna and said means for adding when said indicating means falls below a threshold value; and said switch means including means for storing said indicating signal when said first time delay means is in circuit with said first antenna and for comparing the stored indicating signal just before the time of switching from said first path to said second path with said indicating signal just after switching and for returning to said first path if said signal becomes weaker than just before said time of switching from said first to second path.

15. Apparatus according to claim 14 in which said time delay means includes means for providing a phase shift of 180° of a cycle of the carrier frequency.

16. Apparatus according to claim 15 in which said indicating signal is a squelch signal and said indicating means includes a squelch detector for detecting the strength of said squelch signal.

17. Apparatus according to claim 16 in which:

said first and second paths are between said first antenna and said means for adding; and
said switch means further includes diode switch means for closing said first path in response to one signal level from said indicating means and closing said second path in response to another level signal.

18. Apparatus according to claim 15 in which:
said first and second paths are between said first antenna and said means for adding; and
said switch means further includes diode switch means for closing said first path in response to one signal level from said indicating means and closing said second path in response to another level signal.

19. Apparatus according to claim 14 in which said indicating signal is a squelch signal and said indicating means includes a squelch detector for detecting the strength of said squelch signal.

20. Apparatus according to claim 14 in which:
said first and second paths are between said first antenna and said means for adding; and
said switch means further includes diode switch means for closing said first path in response to one signal level from said indicating means and closing said second path in response to another level signal.

21. A method of processing signals transmitted over multipath routes on a carrier frequency comprising the steps of:
receiving said signals through at least two antennas;
adding the signals received on said antennas;
selecting one of a first mode in which there is no phase shift in the signals from a first of said antennas and a second mode in which there is a phase shift of 180° of the carrier frequency of said signals received from the one of said antennas before said signals are added;
comparing the amplitude of the sum of the added signals to a predetermined threshold value;
selecting said second mode when said amplitude is lower than a said predetermined threshold value;
the step of selecting said second mode including the step of transmitting the signal from said one antenna through time delay circuits;
the step of comparing the amplitude of the sum of said signals includes the step of comparing the amplitude of a squelch signal from a squelch circuit in a radio receiver to said predetermined value;
the step of selecting one of the first and second modes including the step of selecting one of a first and second paths;
said step of selecting said second path including the step of selecting a path having a time delay;
the step of selecting said first path including the step of biasing a diode in one direction in one of said first and second paths with a signal derived from the squelch circuit; and
the step of selecting the second path including the step of biasing said diode the opposite direction from said first direction with the signal derived from the squelch circuit.

22. Apparatus for processing electromagnetic signals transmitted at a carrier frequency over a multipath route, comprising:
at least first and second antennas;
means for adding the signals received by said first and second antennas together to provide a sum signal;
time delay means for providing a phase shift of at least 90° of a cycle of the carrier frequency;
receiver means for processing said sum signal;
indicating means for providing an indicating signal related to the strength of said sum signal;
switching means responsive to said indicating means for selectively connecting said time delay means into one path between said first antenna and said means for adding and connecting said first antenna directly to said means for adding through a second path;
said indicating signal being a squelch signal and said indicating means includes a squelch detector for detecting the strength of said squelch signal;
said first and second paths being between said first antenna and said means for adding; and
diode switch means for closing said second path in response to one signal level from said indicating means and closing said second path in response to another level signal.

23. Apparatus for processing electromagnetic signals transmitted at a carrier frequency over a multipath route, comprising:
at least first and second antennas;
means for adding the signals received by said first and second antennas together to provide a sum signal;
time delay menas for providing a phase shift of at least 90° of a cycle of the carrier wave of said signals;
receiver means for processing said sum signal;
indicating means for providing an indicating signal related to the strength of said sum signal;
switch means responsive to said indicating means for selectively connecting said time delay means into one path between said first antenna and said means for adding and connecting said first antenna directly to said means for adding through a second path;
said first and second paths being between said first antenna and said means for adding; and
diode switch means for closing said first path in response to one signal level from said indicating means and closing said second path in response to another level signal.

24. Apparatus for processing electromagnetic signals transmitted at a carrier frequency over a multipath route, comprising:
at least first and second antennas;
means for adding the signals received by said first and second antennas together to provide a sum signal;
time delay means for providing a phase shift of 180° of a cycle of the carrier frequency;
receiver means for processing said sum signal;
indicating means for providing an indicating signal related to the strength of said sum signal;
switch means responsive to said indicating means for selectively connecting said time delay means into one path between said first antenna and said means for adding and connecting said first antenna directly to said means for adding through a second path;
said indicating signal being a squelch signal and said indicating means includes a squelch detector for detecting the strength of said squelch signal;
said first and second paths being between said first antenna and said means for adding; and
diode switch means for closing said first path in response to one signal level from said indicating means and closing said second path in response to another level signal.

25. Apparatus for processing electromagnetic signals transmitted at a carrier frequency over a multipath route, comprising:
- at least first and second antennas;
- means for adding the signals received by said first and second antennas together to provide a sum signal;
- time delay means of at least 90° of a cycle of the carrier wave of said signals;
- receiver means for processing said sum signal;
- indicating means for providing an indicating signal related to the strength of said sum signal;
- switch means responsible to said indicating means for selectively connecting said time delay means into one path between said first antenna and said means for adding and connecting said first antenna directly to said means for adding through a second path;
- means for comparing the signal at the time of switching to said one path from said second path and for returning to said one path if said signal becomes weaker than at said time of switching from said second to said one path;
- said time delay means provides a phase shift of 180° of a cycle of the carrier frequency;
- said indicating means including a squelch detector for detecting the strength of said squelch signal;
- said first and second paths being between said first antenna and said means for adding; and
- diode switch means for closing said first path in response to one signal level from said indicating means and closing said second path in response to another level signal.

* * * * *

UNITED STATES PATENT AND TRADEMARK OFFICE
CERTIFICATE OF CORRECTION

PATENT NO. : 4,293,955
DATED : October 6, 1981
INVENTOR(S) : Marvin M. Gehr et al It is certified that error appears in the above-identified patent and that said Letters Patent are hereby corrected as shown below:

Column 8, line 12, change "mode" to --modes--;

Column 9, line 48, change "mode" to --modes--;

Column 12, line 23, change "menas" to --means--.

Signed and Sealed this

Thirteenth Day of July 1982

[SEAL]

Attest:

*Attesting Officer*

GERALD J. MOSSINGHOFF

*Commissioner of Patents and Trademarks*